United States Patent
Amidei

[19]
[11] Patent Number: 5,920,406
[45] Date of Patent: Jul. 6, 1999

[54] MARGIN SEEKING FOR MULTIPLE COPY JOBS

[75] Inventor: James S. Amidei, San Diego, Calif.

[73] Assignee: Hewlett-Packard Co., Palo Alto, Calif.

[21] Appl. No.: 08/876,071

[22] Filed: Jun. 13, 1997

[51] Int. Cl.[6] .................................................. H04N 1/387
[52] U.S. Cl. .................... 358/453; 358/296; 358/449; 358/401; 382/176
[58] Field of Search ...................... 358/296, 401, 358/501, 434, 443, 444, 448, 449, 450, 453, 488; 399/182, 183; 382/173, 175, 176, 177

[56] References Cited

U.S. PATENT DOCUMENTS

| | | | |
|---|---|---|---|
| 4,384,272 | 5/1983 | Tanaka et al. | 382/50 |
| 4,899,227 | 2/1990 | Yamada | 358/452 |
| 5,124,799 | 6/1992 | Tsuboi et al. | 358/296 |
| 5,613,017 | 3/1997 | Rao et al. | 382/174 |
| 5,778,276 | 7/1998 | Hasegawa | 399/17 |
| 5,784,487 | 7/1998 | Cooperman | 382/175 |
| 5,787,199 | 7/1998 | Lee | 382/203 |
| 5,856,877 | 1/1999 | Burger et al. | 358/452 |
| 5,862,249 | 1/1999 | Jang et al. | 382/132 |

*Primary Examiner*—Peter S. Wong
*Assistant Examiner*—Derek J. Jardieu

[57] ABSTRACT

A technique for making multiple copies that includes the steps of scanning a scan region that contains the image to be copied to produce an array of scan region pixel data that contains pixel data for the entire scan region; printing an image based on the array of scan region pixel data; processing the scan region pixel data to determine a subregion of the scan region that contains printable, non-background information; scanning the subregion of the scan region and providing to a print buffer print data only for the subregion of the scan region that contains printable, non-background information; and printing an image based on the subregion print data.

12 Claims, 4 Drawing Sheets

MARGIN SEEKING FOR MULTIPLE COPY JOBS

BACKGROUND OF THE INVENTION

The subject invention generally relates to image copying, and more particularly techniques for efficiently scanning an image multiple times to make multiple copies.

Digital copiers commonly include a scanner section that optically scans a scan region that contains a source image to be copied or reproduced and provides a scan data output that is a digitized representation of the scan region, an image processor that processes the scan data and generates print data, a print buffer memory for buffering the print data output of the image processor, and a printer section for printing the print data.

A straightforward way to make multiple copies of a particular image with the foregoing digital copier structure is to scan the scan region once, store the print data in the print buffer memory, and then repeatedly print the buffered print data. However, this technique requires sufficient memory to store the print data for the entire scan region, which increases the cost of the copier.

A simple technique of making multiple copies with a digital copier that does not have sufficient memory to store all of the print data for an entire scan region would be to repeatedly scan the entire scan region a number of times as required. This, however, would be time consuming. Time is further consumed, in the form of processor bandwidth, by requiring the processor to move wider pieces of data from the image processor section to the print buffer. Time is also consumed as a result of scanner stalls which occur when the print buffer fills because the image processor typically produces print data faster than the print section utilizes the print data. Scanner stalls also degrade print quality by producing a slight overlap or gap between printed areas that correspond to image regions that were scanned before and immediately after a scanner stall.

SUMMARY OF THE INVENTION

It would therefore be an advantage to provide an improved technique of making multiple copies of an image.

The foregoing and other advantages are provided by the invention in a method of making multiple copies of an image that includes the steps of (a) scanning a scan region that contains the image to be copied to produce an array of scan region pixel data that contains pixel data for the entire scan region; (b) printing an image based on the array of scan region pixel data; (c) analyzing scan region pixel data to determine a subregion of the scan region that contains printable, non-background information; (d) scanning the subregion of the scan region to produce an array of print data that contains print data only for the subregion of the scan region that contains printable, non-background information; and (e) printing an image based on the subregion print data.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
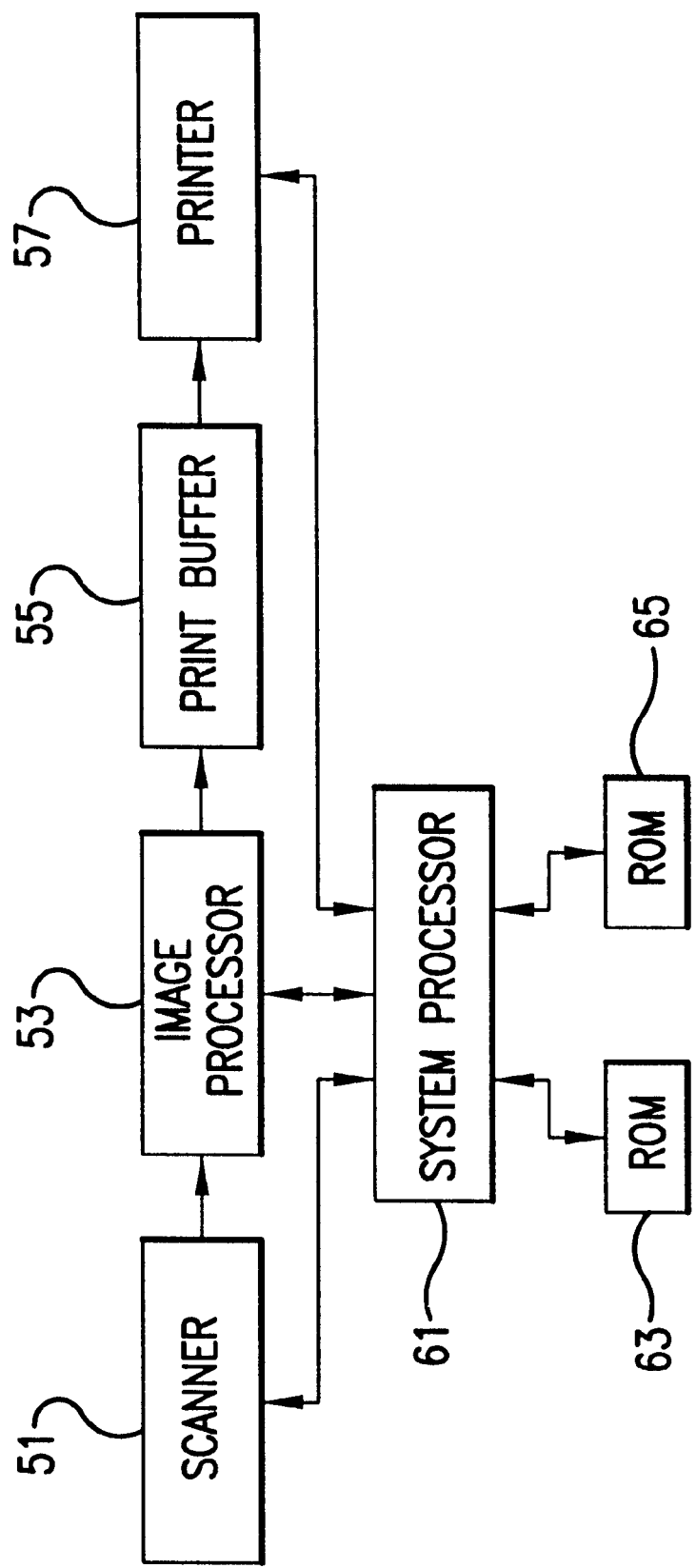
FIG. 1 sets forth a schematic block diagram of a digital copier system in which the invention is advantageously employed.

In the following detailed description and in the several figures of the drawing, like elements are identified with like reference numerals.

Referring now to FIG. 1, set forth therein is a simplified schematic diagram of a digital color copier system in which the invention can be advantageously employed. An optical color scanner section 51 provides a means of optically scanning a document that is to be reproduced, and more particularly provides to an image processor 53 a digitized scan data output that is a digitized representation of the information scanned by the scanner section 51. The scanner section 51 per se can be of a type well known in the art, and can be implemented as a moving scanner type or a moving paper type. Depending upon implementation, the scanner section 51 and/or the image processor 53 includes suitable buffer storage.

The image processor 53 processes the scan data and produces print data that is buffered in a print data buffer 55. The buffer print data is retrieved by a printer section 57 which comprises for example a color printer apparatus such as a color laser printer or a color ink jet printer The printer section 57 can be implemented as a stand-alone printer, or as a printer that is integrated in a multi-function hardcopy apparatus.

The scanner section 51, the image processor 53, and the printer section 55 operate under overall control of a system processor 61. A read only memory (ROM) 63 contains suitable instructions for the operation of the digital copier system including instructions for performing a copying operation in accordance with the invention, and a random access memory (RAM) 61 is provided in a conventional manner as a working memory for the system processor 61.

Figure 2:
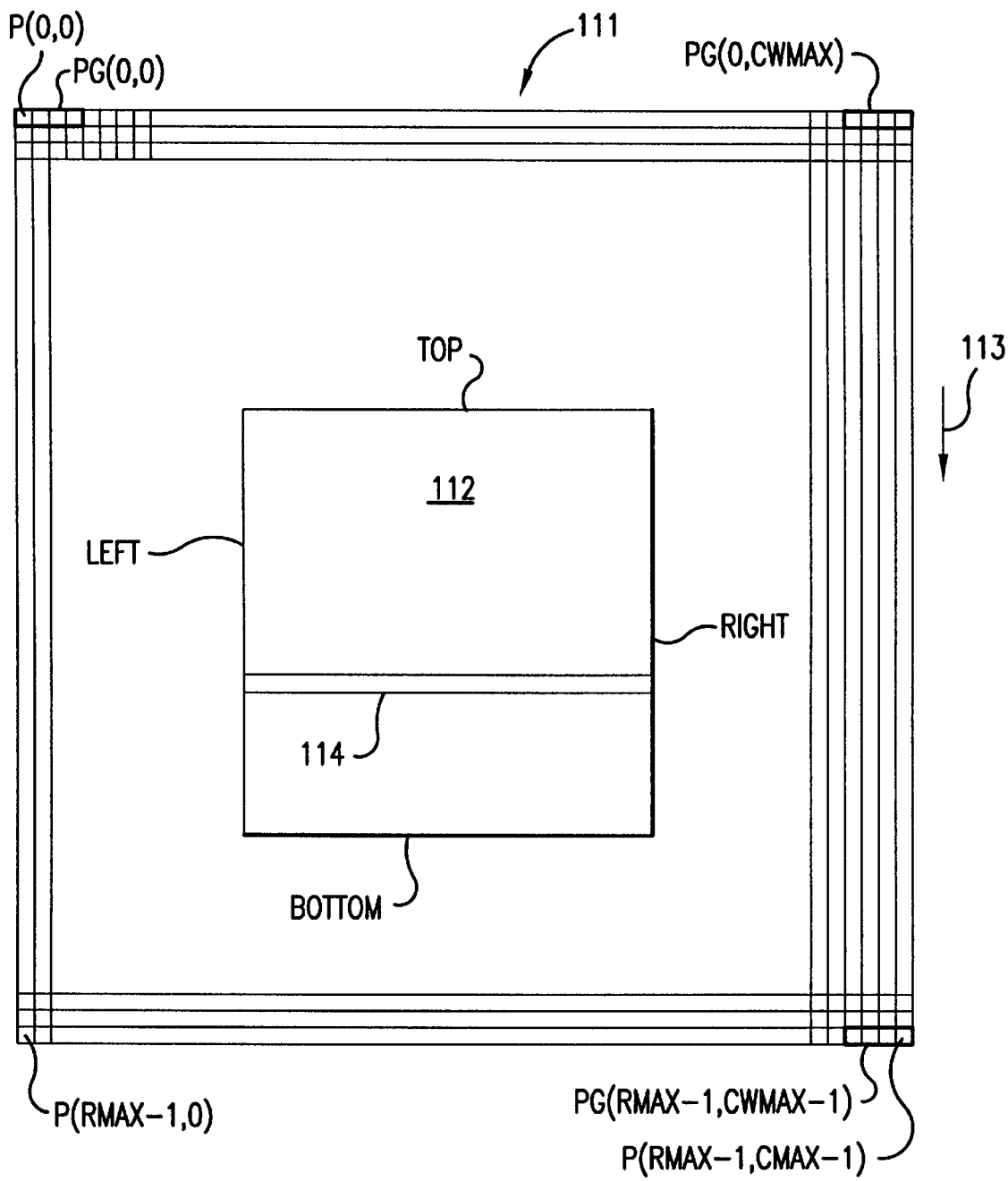
FIG. 2 sets forth a diagrammatic depiction of a scan region that is copied in accordance with the invention FIG. 3 sets forth a flow diagram of a copying procedure in accordance with the invention.

Referring now to FIG. 2, the scanner section 51 is adapted to optically scan a scan region 111, defined for example relative to a copy glass on which a document to be copied is placed. In accordance with conventional scanner operation, the scanner section 51 more particularly optically samples the contents of a plurality of pixel locations or pixels P(I,J) arranged in a rectilinear array of RMAX rows and CMAX columns in the scan region 111, wherein I is the row index and J is the column index, and wherein RMAX is the number of pixel rows and CMAX is the number of pixel columns. By way of example, the pixels are indexed such that the upper left pixel is identified by P(0,0) and the lower right pixel is identified by P(RMAX-1, CMAX-1). The digitized scan data provided by the scanner section 51 comprises pixel image data for each of the pixels P(I,J), and for ease of reference, the pixel data for each pixel P(I,J) is commonly called a pixel. For purposes of processing efficiency, the pixel data for each row of pixels P(I,J) can be organized in N-pixel groups PG, in which case the pixel array would contain pixel groups PG(0,0) through PG(RMAX-1, CWMAX-1), wherein CWMAX is the number of pixel group columns in the scan region 111.

By way of illustrative example, for the particular implementation of a moving scanner wherein a scan carriage is moved from one edge of the scan region 111 to the opposite edge, the scan region 111 is scanned one pixel row at a time starting with the first row of pixels that includes pixels P(0,0) through P(1,CMAX−1), as indicated by a scan direction arrow 113.

Figure 3:
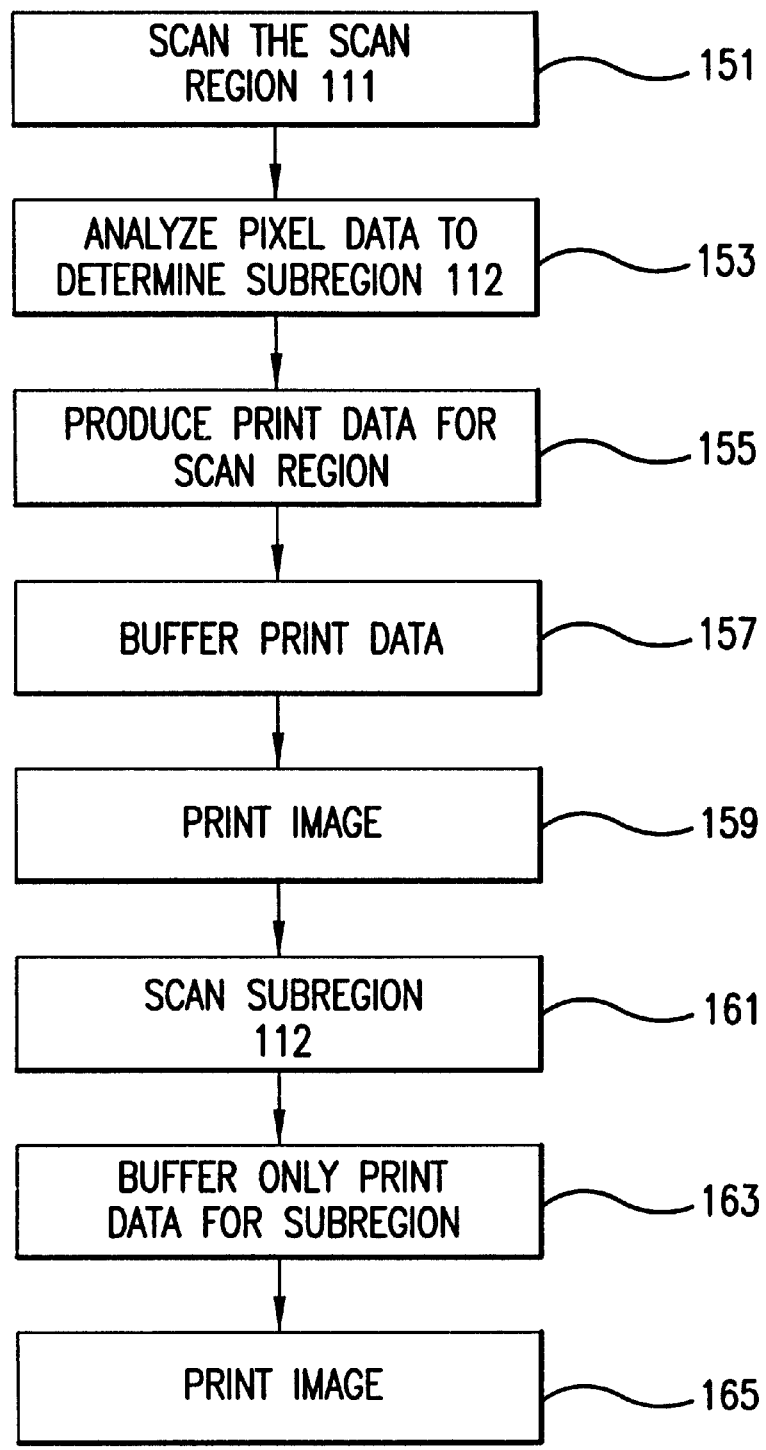

Referring now to FIG. 3, set forth therein is a flow diagram illustrating a procedure for making multiple copies in accordance with the invention. At 151 the entire scan region 111 (FIG. 2) is conventionally scanned, for example by moving a scan carriage across all pixel rows of the scan region 111. At 153 the pixel data provided by the scanner section 51 is analyzed to determine a rectangular subregion 112 (FIG. 2) that includes all of the pixels or pixel groups of the scan region 111 that contain non-background printable information of the image in the scan region. The rectangular subregion 112 is for example defined by the row position TOP of the topmost pixel row that contains printable information, the row position BOTTOM of the lowermost pixel row that contains printable information, the column position LEFT of the leftmost pixel or pixel group that contains printable information, and the column position RIGHT of the rightmost pixel or pixel group that contains printable information. The subregion 112 is more particularly comprised of subrows 114.

At 155 scan data provided by the scanner section 51 is processed by the image processor 53 to produce print data, and at 157 the print data is buffered in the buffer memory 55 (FIG. 2), for example as a series of logical records wherein each logical record is based on or corresponds to an entire row of pixels of the scan region 111. At 159 an image based on the buffered scan region pixel data is printed.

At 161 the scanner section 51 is operated to scan the pixel rows of the scan region 111 determined to contain printable information, for example by controlling the scan carriage of the scanner section 51 to scan only the region between the TOP row and the BOTTOM row which define the top and bottom limits of the printable information in the scan region 111. At 163 only the print data for the pixels or pixel groups in the subregion 112 (i.e., the subrows 114) is buffered in the print buffer memory 55, for example as a series of logical records wherein each logical record is based on or corresponds to an a subrow 114 of pixels of the subregion 112. At 165 an image based on the print data for the subregion 112 is printed. In this manner, only print data for the subregion 112 is stored in the print buffer memory 55 for the second and subsequent scans of a predetermined image.

It should be appreciated that the scanning of the entire scan region 111 as well as the scanning of the scan subregion 112 can be performed incrementally as to portions of the region to be scanned, depending on the size of the print buffer memory 55. In other words, the steps of scanning, processing and buffering can be performed iteratively for adjacent scan sub-regions. It should also be appreciated that the step of processing can be performed prior to the step of analyzing, or such steps can be performed concurrently.

The print buffer 55 is preferably implemented as a memory device having a plurality of storage locations that are controllably divided into a plurality of logical records of selectable length. For example, if the print buffer includes N storage locations, it can store N/M logical records of length M. Thus, the print buffer 55 can store more logical records of shorter length.

Buffering only the print data for the subregion 112 in accordance with the invention advantageously reduces scan time and improves scan quality as compared to buffering print data for the entire region 111, since the buffer memory 55 is used in a more optimal manner.

In particular, for the second and subsequent scans of a predetermined image, the length or size of each of the logical records of the print buffer is selected such that a logical record holds print data for a single subrow 114 of the subregion 112. Since a logical record for the print data for a single subrow 114 of the subregion 112 is shorter than a logical record for the print data for an entire row of the scan region ill, the print buffer 55 can hold more subrow logical records than entire row logical records. As a result of increasing the number of logical records in the print buffer 55, the number of stalls of the scanner section 51, per copy, due to a full print buffer 55 is reduced. The print buffer 55 typically fills up because the image processor 51 produces print data faster than the printer section 57 consumes the print data. When the print buffer 55 is full, the image processor 51 stalls which in turn stalls the scanner section 51. When the number of logical records in the print buffer is increased, the image processor 51 will stall less frequently, since the image processor can buffer more logical records. That is, when only subrow data is buffered, the print buffer holds more lines of print data, wherein such lines are shorter than lines of print data for entire pixel rows.

As a result of reduced scanner stalling, scan time is advantageously reduced, since significant time overhead is incurred in re-positioning and re-accelerating the scanning mechanism. Moreover, scan quality is increased when scanner stalling is reduced, since the scanner re-positioning is reduced. As is well appreciated, scanner positioning mechanisms are subject to mechanical tolerances, and each scanner mechanism re-position after a stall can result in either a slight overlap or a slight gap between regions of pixel data that were scanned immediately before a scanner stall and immediately after such scanner stall.

Scan time is further advantageously reduced by scanning only the region between the TOP pixel row and the BOTTOM pixel row of the subregion 112, as compared to scanning all pixel rows of the scan area 111, since the scan carriage moves a shorter distance both for the scanning of the subregion 112 from the TOP pixel row of the subregion 112 to the BOTTOM pixel row of the subregion 112 and for the retrace of the scan carriage from the BOTTOM pixel row to the TOP pixel row.

Effectively, the invention contemplates determining a bounding box that fully encloses all of the printable information in the scan region 111, scanning a portion of the scan region 111 that contains the bounding box, where such portion may be larger than the bounding box as required by the particular implementation, and buffering only print data for those pixel locations enclosed by the bounding box. By way of illustrative example, the bounding box can be defined in the same manner as the subregion 112; namely, by the TOP pixel row, BOTTOM pixel row, LEFT pixel or pixel group column, and RIGHT pixel or pixel group column of the subregion 112. Such bounding box can also be defined by the upper left pixel or pixel group and the lower right pixel or pixel group.

Stated another way, the top, bottom, left and right margins of the scan region 111 that do not contain printable, non-background information are defined; the second and any subsequent scans are limited to the region between the top margin and the bottom margin; and only print data for the region between the margins is provided to the print buffer 55. Depending on implementation, for the second and subsequent scans the scanner section 51 can provide to the image processor 53 only pixel data for the subrows 114 of the subregion 112. Alternatively, for the second and subsequent scans the scanner section 51 provides to the image processor 53 pixel data for the entire rows between the top margin and the bottom margin. Further depending upon implementation, for the second and subsequent scans the image processor 53 processes either the pixel data for entire rows, or for subrows.

Figure 4:
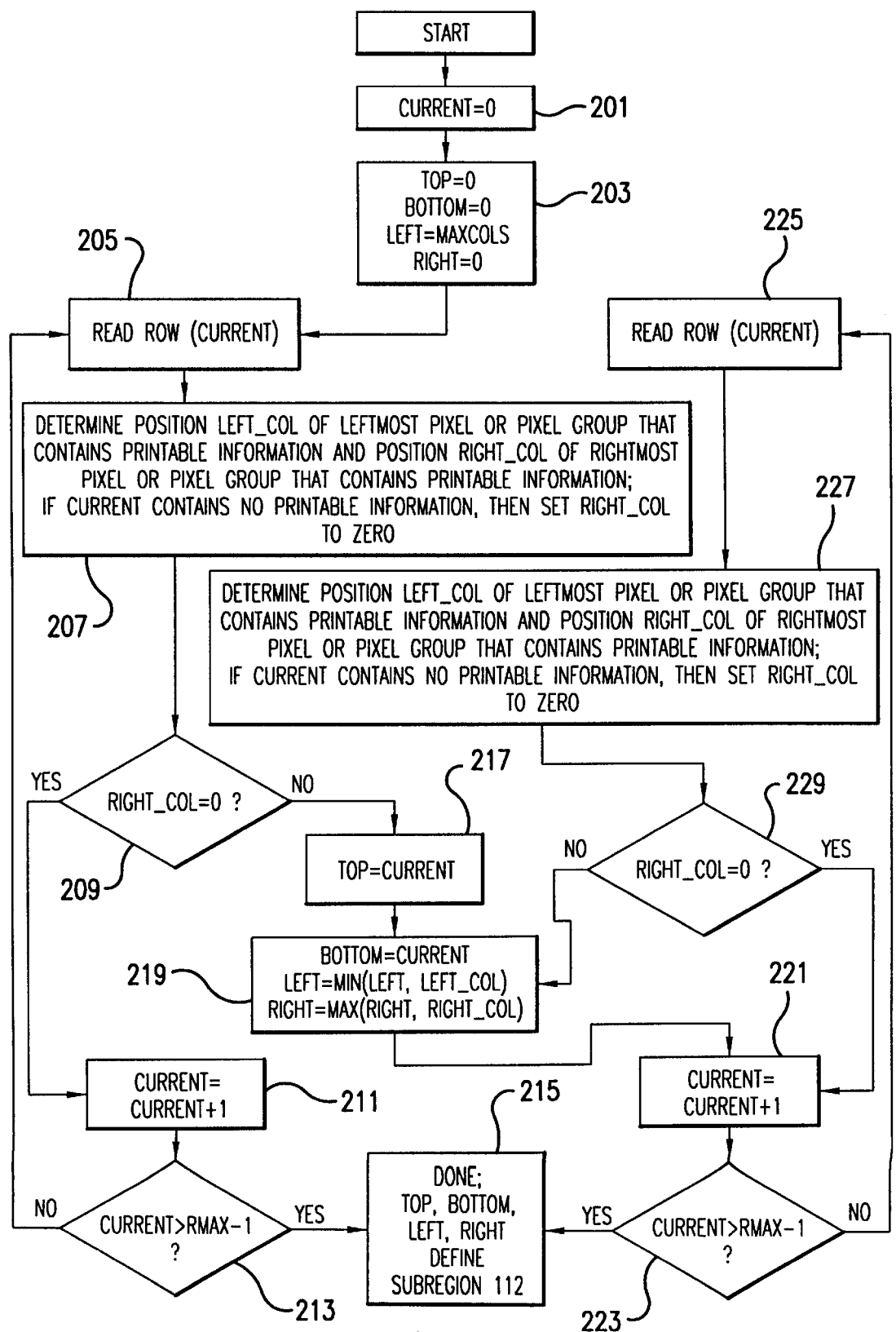
FIG. 4 sets forth a flow diagram of a procedure for determining a subregion of the scan region of FIG. 2 that contains printable, non-background information.

Referring now to FIG. 4, set forth therein by way of illustrative example is a flow diagram of a procedure for determining the scan subregion 112. At 201 a row counter CURRENT is initialized to zero. At 203 the row position TOP of the top row of the subregion 112, the row position BOTTOM of the bottom row of the subregion 112, and column position RIGHT of the rightmost pixel or pixel group column of the subregion 112 are initialized to zero. The column position LEFT of the leftmost pixel or pixel group column of the subregion 112 is initialized to MAXCOLS, which is the number of pixel or pixel group columns in the scan region 111 of FIG. 2 (i.e., MAXCOLS is equal to either CMAX or CWMAX, depending on whether the pixel image data is processed by pixel or by pixel group).

At 205 the pixel data for the current row ROW (CURRENT) is read, for example as the scanner section 51 provides image data on a pixel row by pixel row basis. At 207 the column position $LEFT_{13}$ COL of the leftmost the pixel or pixel group of the current row that contains data is determined, and the column position $RIGHT_{13}$ COL of the rightmost pixel or pixel group of the current row that contains data is determined. If the current row contains no printable data, $RIGHT_{13}$ COL is set to zero. At 209 a determination is made as to whether $RIGHT_{13}$ COL is zero. If $RIGHT_{13}$ COL is zero, at 211 the row index CURRENT is incremented by one, and at 213 a determination is made as to whether CURRENT is greater than (RMAX−1). If no, control transfers to 205 where the pixel data for the current row ROW(CURRENT) is read. If the determination at 213 is yes, the procedure is done, and the TOP pixel row, BOTTOM pixel row, LEFT pixel or pixel group column, and RIGHT pixel or pixel group column of the subregion 112 have been determined.

If the determination at 209 is no, which indicates that ROW(CURRENT) contains printable data, at 217 TOP is set to the present value of CURRENT. At 219 BOTTOM is set to the present value of CURRENT, LEFT is set to the minimum of the present value of LEFT or the present value of $LEFT_{13}$ COL, and RIGHT is set to maximum of the present value of RIGHT or the present value of $RIGHT_{13}$ COL. At 221 the row index CURRENT is incremented by one, and at 223 a determination is made as to whether CURRENT is greater than (RMAX−1). If no, at 225 the pixel image data for the current row ROW(CURRENT) is read. At 227 the column position $LEFT_{13}$ COL of the leftmost pixel or pixel group of the current row that contains data is determined, and the column position $RIGHT_{13}$ COL of the rightmost pixel or pixel group of the current row that contains data is determined. If the current row contains no printable data, $RIGHT_{13}$ COL is set to zero. At 229 a determination is made as to whether $RIGHT_{13}$ COL is zero. If $RIGHT_{13}$ COL is zero, control transfers to 219 where BOTTOM is set to the present value of CURRENT, LEFT is set to the minimum of the present value of LEFT or the present value of $LEFT_{13}$ COL, and RIGHT is set to maximum of the present value of RIGHT or the present value of $RIGHT_{13}$ COL. If the determination at 229 is yes, control transfers to 221 where the row index CURRENT is incremented by one.

If the determination at 223 is yes, the procedure is done, and the TOP pixel row, BOTTOM pixel row, LEFT pixel or pixel group column, and RIGHT pixel or pixel group column of the subregion 112 have been determined.

The foregoing procedure defines the subregion 112 by identifying the row position TOP of the topmost pixel row that contains printable data, the column position LEFT of the leftmost pixel or pixel group that contains printable data, the column position RIGHT of the rightmost pixel or pixel group that contains printable data, and the row position BOTTOM of the bottommost pixel row that contains printable data. The corresponding bounding box can be defined by the upper left pixel or pixel group which has coordinates of (TOP, LEFT) and the lower right pixel or pixel group which has coordinates of (BOTTOM, RIGHT).

The foregoing has thus been a disclosure of a technique for efficiently making multiple copies which advantageously increases system performance by requiring the system processor to do less movement of data, both in terms of the width of each row of data and in the length of the overall scan, by reducing the number of scanner stalls, and also by allowing the scan carriage to move a shorter distance both for scanning and retracing. The invention further advantageously reduces product cost by allowing the copier to provide data to the printer mechanism while the information to be copied is being scanned, thereby allowing for smaller memory.

What is claimed is:

1. A method of copying an image comprising the steps of:

scanning a scan region that contains the image to be copied to produce an array of scan region pixel data that contains pixel data for the entire scan region;

printing an image based on the array of scan region pixel data;

processing the scan region pixel data to determine a subregion of the scan region that contains printable, non-background information;

scanning the subregion of the scan region to produce an array of print data that contains print data only for the subregion of the scan region that contains printable, non-background information; and printing an image based on the subregion print data.

2. The method of claim 1 wherein the scan region comprises an array of pixels arranged in pixel rows and pixel columns.

3. The method of claim 2 wherein the step of processing includes the steps of:

identifying a topmost pixel row that contains printable information;

identifying a bottommost pixel row that contains printable information;

identifying a leftmost pixel column that contains printable information; and identifying a rightmost pixel column that contains printable information.

4. The method of claim 3 wherein the step of scanning the subregion comprises the step of scanning only the pixels between the topmost pixel row that contains printable information and the bottommost row that contains printable information.

5. The method of claim 1 wherein the scan region comprises an array of pixels arranged in pixel rows and pixel group columns.

6. The method of claim 5 wherein the step of processing includes the steps of:

identifying a topmost pixel row that contains printable information;

identifying a bottommost pixel row that contains printable information;

identifying a leftmost pixel group column that contains printable information; and identifying a rightmost pixel group column that contains printable information.

7. The method of claim 6 wherein the step of scanning the subregion comprises the step of scanning only the pixels between the topmost pixel row that contains printable information and the bottommost row that contains printable information.

8. The method of claim 1 wherein the scan region comprises a rectangular region and wherein the scan subregion comprises a rectangular subregion.

9. A copier system comprising:

scanning means for scanning a scan region to produce scan information;

processing means for analyzing said scan information and determining a scan subregion to which printable information is confined, said scan subregion including a top pixel row and a bottom pixel row;

said scanning means further scanning only a region that is between said top pixel row and said bottom pixel row;

a print buffer; and said processing means providing to said print buffer only print data based on said scan subregion for second and subsequent scans of a predetermined image.

10. The copier system of claim 9 wherein said scanning means provides scan information only for said scan subregion for second and subsequent scans of a predetermined image.

11. The copier system of claim 9 wherein said image processing means processes only scan information for second and subsequent scans of a predetermined image.

12. The copier system of claim 9 wherein said print buffer comprises logical records of selectable length.

* * * * *